United States Patent
Van Mullekom et al.

(10) Patent No.: US 6,644,095 B2
(45) Date of Patent: Nov. 11, 2003

(54) CONTINUOUS ON-BOARD DIAGNOSTIC LUBRICANT MONITORING SYSTEM AND METHOD

(75) Inventors: Jennifer H. Van Mullekom, Mentor, OH (US); Michael Charles Melnyk, University Heights, OH (US); Bhupinder Singh Dayal, Twinsburg, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/173,269

(22) Filed: Jun. 17, 2002

(65) Prior Publication Data

US 2002/0178780 A1 Dec. 5, 2002

Related U.S. Application Data

(62) Division of application No. 09/688,330, filed on Oct. 12, 2000.

(51) Int. Cl.$^7$ ............................................. G01N 33/26
(52) U.S. Cl. ......................................... 73/10; 75/53.05
(58) Field of Search ..................... 73/53.05, 54.01, 73/54.02, 10, 54.28, 54.29, 54.31, 54.32, 54.33, 54.34, 54.35

(56) References Cited

U.S. PATENT DOCUMENTS

| | | | |
|---|---|---|---|
| 2,599,583 A | 6/1952 | Robinson et al. | 175/183 |
| 3,253,606 A | 5/1966 | Kuntz et al. | 137/115 |
| 3,389,596 A * | 6/1968 | Lion et al. | 73/54.39 |

(List continued on next page.)

FOREIGN PATENT DOCUMENTS

| | | |
|---|---|---|
| DE | 10013590 A1 | 9/2001 |
| EP | 0859226 A2 | 8/1998 |
| EP | 0928883 A1 | 7/1999 |
| GB | 2306660 A | 5/1997 |
| WO | WO 98/39631 | 9/1998 |

OTHER PUBLICATIONS

International Search Report from corresponding PCT International Application No. PCT/US01/30224.

Primary Examiner—Helen Kwok
Assistant Examiner—C D Garber
(74) Attorney, Agent, or Firm—Teresan W. Gilbert; Michael F. Esposito

(57) ABSTRACT

A continuous on-board diagnostic lubricant monitoring system and method evaluates lubricant quality and detects incipient lubricant failure due to contamination by measuring physical characteristics of the lubricant itself. The lubrication system (1) employs a diagnostic cell (27) which samples engine lubricant (EL) from an engine (2), and exposes the samples to sensors (28) which measure its physical characteristics. The senors (28) preferably include a permittivity sensor, a viscosity sensor, and a temperature sensor. Diagnostic testing based on the measurements can be carried out on-board via a controller (30) running selected algorithms or processes. A time to condemning limit for the lubricant, i.e., the time until the lubricant has degraded to given quality level, is calculated based on permittivity data received by the controller (30) from the sensors (28). Likewise, a time to condemning limit is calculated based on viscosity data. Based on the permittivity and temperature data, the controller (30) is able to detect incipient failure of the lubricant due to water or coolant contamination. Additionally, based on the monitored lubricant viscosity, the controller (30) is able to detect fuel contamination. In this manner, a superior lubricant monitoring system and method is achieved which is particularly applicable to railroad locomotives, mining machinery, and other off-highway vehicles.

6 Claims, 6 Drawing Sheets

U.S. PATENT DOCUMENTS

| | | |
|---|---|---|
| 3,746,974 A | 7/1973 | Stoakes et al. ............... 324/61 |
| 3,876,916 A | 4/1975 | Stoakes ....................... 317/249 |
| 4,345,202 A | 8/1982 | Nagy et al. ................. 324/58.5 |
| 4,646,070 A | 2/1987 | Yasuhara et al. ........... 340/603 |
| 4,677,847 A * | 7/1987 | Sawatari et al. ........... 73/53.05 |
| 4,733,556 A | 3/1988 | Meitzler et al. ............... 73/64 |
| 5,274,335 A | 12/1993 | Wang et al. ................. 324/689 |
| 5,382,942 A | 1/1995 | Raffa et al. ............... 340/457.4 |
| 5,435,170 A | 7/1995 | Voelker et al. ............ 73/53.05 |
| 5,540,086 A | 7/1996 | Park et al. ................ 73/53.05 |
| 5,656,767 A | 8/1997 | Garvey, III et al. ........ 73/61.44 |
| 5,749,339 A | 5/1998 | Graham et al. ................ 123/73 |
| 5,964,318 A * | 10/1999 | Boyle et al. .................. 184/1.5 |
| 5,968,371 A | 10/1999 | Verdegan et al. ............ 210/739 |
| 5,969,601 A * | 10/1999 | Sato et al. ................ 340/450.3 |
| 6,082,322 A | 7/2000 | Graham et al. .......... 123/196 S |
| 6,257,051 B1 * | 7/2001 | Boyle et al. ............... 73/54.01 |
| 6,286,363 B1 * | 9/2001 | Discenzo ................... 73/53.01 |
| 2002/0011095 A1 * | 1/2002 | Park et al. |
| 2003/0033860 A1 * | 2/2003 | Hajduk et al. |

* cited by examiner

CONTINUOUS ON-BOARD DIAGNOSTIC LUBRICANT MONITORING SYSTEM AND METHOD

This is a divisional of case U.S. Ser. No. 09/688,330 Filed Oct. 12, 2000, entitled "Continuous On-Board Diagnostic Lubricant Monitoring System and Method".

BACKGROUND OF THE INVENTION

The present invention relates to the art of oil and/or lubricant diagnostics. It finds particular application in conjunction with diesel engines such as those employed in off-highway vehicles, e.g., railroad locomotives, mining vehicles and machinery, etc. It will be described with particular reference thereto. However, it is to be appreciated that the present invention is also amenable to other internal combustion engines and the like which employ lubrication systems for various applications, be it off-highway applications, on-highway applications, or otherwise.

Maintenance of engine lubricant quality is essential to the proper operation and long service life of an internal combustion engine. A responsibility of the engine operator or maintenance personnel is to periodically check the lubricant and, if needed, add an appropriate amount of fresh lubricant or change the lubricant entirely to maintain the lubricant in the engine at a desired quality level. As used herein, the term "fresh lubricant" includes a base lubricant (e.g., a natural oil, a synthetic oil, or the like) containing desired quantities and types of lubricant additives or adjuncts.

In general, the quality of the lubricant in an engine degrades with engine use. Lubricant degradation occurs due to depletion of lubricant additives that perform specific functions such as control viscosity, reduce wear, increase lubricity, minimize deposits, prevent oxidation, and other desirable features. Lubricant degradation can also occur by the ingestion of foreign materials into the lubricant such as dirt from the surrounding environment, wear materials from the engines that occur as part of the natural operating process, and blow-by from the combustion process. Lubricant degradation can also occur due to a break-down of the base stock of the lubricant. In the extreme case fuel or water/coolant contamination of the lubricant can cause lubricant degradation.

Two ways of improving the quality of the engine lubricant is to periodically remove some or all of the engine lubricant and replace it with fresh lubricant. Also, in most cases filters are used to remove foreign materials above a certain size from the engine lubricant. Various systems have been proposed for periodically removing a given quantity of lubricant from the engine and either storing the lubricant until it can properly be disposed of, or in the case of a diesel engine, optionally periodically injecting the lubricant into the fuel tank where the lubricant is mixed with the fuel and then burned in the engine along with the fuel. Also, it is generally known to provide such systems with automatic lubricant level sensing devices which maintain the proper level of lubricant in the engine.

In some systems, a given quantity of the engine lubricant is removed at preset time intervals based on engine usage factors. In others, small increments of engine lubricant are periodically removed and substantially simultaneously replaced with correspondingly small increments of fresh lubricant. In still others, a given amount of engine lubricant is periodically removed based on sensors that measure different operating variables of the engine such as the level, temperature and/or pressure of the lubricant within the engine, the number of engine starts or crank shaft revolutions, the length of time the engine has been in motion and at rest, engine temperature, fuel consumption, etc. See, e.g., U.S. Pat. No. 5,749,339 to Graham, et al.

However, many previously developed lubrication systems are characterized by certain limitations and/or drawbacks. For example, systems that employ a set periodic maintenance schedule can have less than optimized engine operation time due to unnecessary maintenance down time. Likewise, systems that employ a maintenance schedule based on engine operation and/or operating conditions can also experience the same problem insomuch as these factors, while perhaps indicative, do not directly reflect the lubricant quality. Therefore, estimates of the lubricant's amount of degradation are imprecise and maintenance or lubricant exchanges may be prematurely scheduled. In addition to unnecessary down time, prematurely scheduled maintenance or lubricant exchanges result in unnecessary lubricant consumption. On the other hand, late maintenance or lubrication exchange is even less desirable insomuch as it can result in unnecessary engine wear, reducing engine life, and possible engine failure. Consequently, the previously developed lubrication systems tended to error on the side of premature maintenance and/or premature lubrication exchange.

Moreover, the previously developed systems did not account for or detect conditions which may prompt lubricant failure, such as, e.g., incipient failure detection (IFD) denoted by significant water/coolant contamination and/or fuel contamination of the lubricant. Preset maintenance schedules and maintenance schedules based on engine operation and/or operating conditions do not anticipate lubricant failure due to unexpected contamination.

Accordingly, there is a need for a system that more effectively determines the condition and thus the quality of the engine lubricant, such that when the quality of the engine lubricant degrades a predetermined amount or incipient failure is detected, appropriate corrective or otherwise responsive actions may be taken.

The present invention contemplates a new continuous on-board diagnostic lubricant monitoring system and method which at least partially overcomes the above-referenced problems and others.

SUMMARY OF THE INVENTION

In accordance with one aspect of the present invention, a method of monitoring a lubricant is provided. The method includes the steps of measuring the lubricant's temperature, and measuring the lubricant's permittivity. After temperature dependence in the permittivity has been compensated for, it is determined if the lubricant has been contaminated by water or other coolant.

In accordance with a more limited aspect of the present invention, the method also includes determining a rate of change of the lubricant's permittivity for a first period of time, and determining a rate of change of the lubricant's temperature for a second period of time. The lubricant is then determined to be contaminated by a coolant if the rate of change of the lubricant's permittivity for the first period of time is greater than a first threshold, and an absolute value of the rate of change of the lubricant's temperature for the second period of time is less than a second threshold.

In accordance with a more limited aspect of the present invention, the first and second periods of time are the same.

In accordance with a more limited aspect of the present invention, the method also includes determining a rate of change of the lubricant's temperature for a third period of time, where the third period of time is greater than the first and second periods of time. In this case, for a determination to be made that the lubricant is contaminated by a coolant, it has to also be found that the rate of change of the lubricant's temperature for the third period of time is less than a third threshold In accordance with a more limited aspect of the present invention, the method also includes selecting a minimum temperature from those used to determine the rate of change of the lubricant's temperature for the second time period. In this case, for a determination to be made that the lubricant is contaminated by a coolant, it has to also be found that the minimum temperature is greater than a threshold temperature.

In accordance with another aspect of the present invention, a method of monitoring a lubricant includes obtaining, over time, permittivity data from measured permittivity values of the lubricant. Based on changes in the permittivity data over time, a rate of degradation of the lubricant's quality is determined, and an amount of time until the lubricant reaches a set degraded quality level is further determined.

In accordance with a more limited aspect of the present invention, the method also includes determining if the lubricant has been changed or topped-off by detecting changes in the permittivity data which exceed a threshold level.

In accordance with a more limited aspect of the present invention, the amount of time until the lubricant reaches the set degraded quality level is given by:

(cond_limit−current_perm)/perm_slope where, cond_limit represents a condemning limit defined by the lubricant's permittivity when the lubricant has reach the set degraded quality level; current_perm represents the lubricant's current determined permittivity; and perm_slope represents the determined rate of degradation of the lubricant's quality based on changes in the permittivity data.

In accordance with a more limited aspect of the present invention, the current determined permittivity of the lubricant is a median of a plurality of most recently obtained permittivity data.

In accordance with another aspect of the present invention, a lubrication system for an engine is provided. The lubrication system includes a lubricant, and a diagnostic cell which samples the lubricant for diagnostic testing thereof. The diagnostic cell includes a permittivity sensor which monitors the lubricant's permittivity, and a temperature sensor which monitors the lubricant's temperature.

In accordance with a more limited aspect of the present invention, the diagnostic cell further includes a manifold in which the permittivity and temperature sensors are mounted. The manifold is arranged such that sampled lubricant is selectively made to encounter the permittivity and temperature sensors.

In accordance with a more limited aspect of the present invention, the lubrication system also includes a controller which interfaces with the diagnostic cell to carry out the diagnostic testing. The controller receives permittivity data from the permittivity sensor and temperature data from the temperature sensor.

In accordance with a more limited aspect of the present invention, the diagnostic testing carried out includes determining if the lubricant has been contaminated by a coolant.

In accordance with a more limited aspect of the present invention, the controller determines a rate of change of the lubricant's permittivity for a first time period based on the permittivity data it receives, and the controller determines a rate of change of the lubricant's temperature for a second time period based on the temperature data it receives. The controller determines that the lubricant has been contaminated by a coolant if the rate of change of the lubricant's permittivity for the first time period is greater than a first threshold and an absolute value of the rate of change of the lubricant's temperature for the second time period is less than a second threshold.

In accordance with a more limited aspect of the present invention, the controller further determines a rate of change of the lubricant's temperature for a third time period based on the temperature data it receives. The third time period is longer than the first and second time periods. For the controller to determine that the lubricant has been contaminated by a coolant in this case, the controller has to also find that the rate of change of the lubricant's permittivity for the third time period is less than a third threshold.

In accordance with a more limited aspect of the present invention, the controller further determines a minimum lubricant temperature for the second time period from the temperature data it receives. For the controller to determine that the lubricant has been contaminated by a coolant in this case, the controller has to also find that the minimum lubricant temperature is greater than a threshold temperature.

In accordance with a more limited aspect of the present invention, the controller determines a time to condemning limit for the lubricant based on the permittivity data received. In accordance with a more limited aspect of the present invention, the time to condemning limit is given by:

(cond_limit−current_perm)/perm_slope where, cond_limit represents a condemning limit defined by the lubricant's permittivity when the lubricant has reach a selected level of degradation; current_perm represents the lubricant's current determined permittivity; and perm slope represents a rate of lubricant quality degradation as determined from the permittivity data.

In accordance with a more limited aspect of the present invention, the engine is either a railroad locomotive engine or a mining vehicle engine.

In accordance with another aspect of the present invention, a method of monitoring a lubricant is provided. The method includes obtaining measurements of the lubricant's viscosity and temperature. The viscosity measurements are then normalized based on the temperature measurements such that the normalized viscosity measurements all relate to a common reference temperature. Finally, a condition of the lubricant is diagnosed based on the normalized viscosity measurements.

In accordance with a more limited aspect of the present invention, the diagnosis includes diagnosing fuel contamination and lubricant "shear down" of the lubricant based on the normalized viscosity measurements.

In accordance with a more limited aspect of the present invention, the diagnosis includes distinguishing between different degrees of fuel contamination based on the normalized viscosity measurements.

In accordance with a more limited aspect of the present invention, the method also includes determining, based on the normalized viscosity measurements, a time to condemning limit for the lubricant due to fuel contamination.

In accordance with a more limited aspect of the present invention, the diagnosis includes diagnosing quality degradation of the lubricant based on the normalized viscosity measurements.

In accordance with a more limited aspect of the present invention, the method also includes determining, based on the normalized viscosity measurements, a time to condemning limit for the lubricant due to quality degradation.

In accordance with a more limited aspect of the present invention, the method also includes determining, based on the normalized viscosity measurements, a time to condemning limit for the lubricant.

In accordance with a more limited aspect of the present invention, the time to condemning limit is one of an upper viscosity limit under which it is desired that the lubricant's viscosity remain, or a lower viscosity limit over which it is desired that the lubricant's viscosity remain.

In accordance with another aspect of the present invention, a lubrication system for an engine includes a lubricant, and a diagnostic cell which samples the lubricant for diagnostic testing thereof. The cell includes a viscosity sensor which monitors the lubricant's viscosity, and a temperature sensor which monitors the lubricant's temperature. It is this temperature sensor that is utilized to normalize the viscosity measurement.

A controller interfaces with the diagnostic cell to carry out the diagnostic testing. The controller receives viscosity data from the viscosity sensor and temperature data from the temperature sensor. The viscosity and temperature data is processed to diagnose a condition of the lubricant.

In accordance with a more limited aspect of the present invention, the condition diagnosed is one of fuel contamination of the lubricant, or quality degradation of the lubricant. In accordance with a more limited aspect of the present invention, the viscosity data and the temperature data are processed to determine a time to condemning limit for the lubricant.

In accordance with a more limited aspect of the present invention, the viscosity sensor is a dynamic (rotational) viscocometer.

In accordance with a more limited aspect of the present invention, the lubrication system also includes a data link which transfers data between the lubrication system and a site remote from the lubrication system.

In accordance with a more limited aspect of the present invention, the lubrication system also includes a manifold in which the viscosity and temperature sensors are mounted. The manifold is arranged such that sampled lubricant is selectively made to encounter the viscosity and temperature sensors.

In accordance with a more limited aspect of the present invention, the lubrication system also includes indicating means for providing a human perceivable indication of the condition of the lubricant.

In accordance with a more limited aspect of the present invention, the lubrication system also includes a storage device in which the viscosity and temperature data are saved.

In accordance with a more limited aspect of the present invention, the lubrication system also includes lubricant refreshing means for selectively carrying out one or more functions in response to the diagnosed condition of the lubricant. The functions carried out include removing lubricant from the lubrication system, and/or adding fresh lubricant to the lubrication system.

In accordance with a more limited aspect of the present invention, the engine is a railroad locomotive engine, or a mining vehicle engine.

One advantage of the present invention is continuous on-board monitoring of engine lubricant quality.

Another advantage of the present invention is protection of the engine from excessive lubricant degradation and incipient lubricant failure due to unexpected contamination.

Still another advantage of the present invention is improved engine operation time. Another advantage of the present invention is lubricant conservation.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
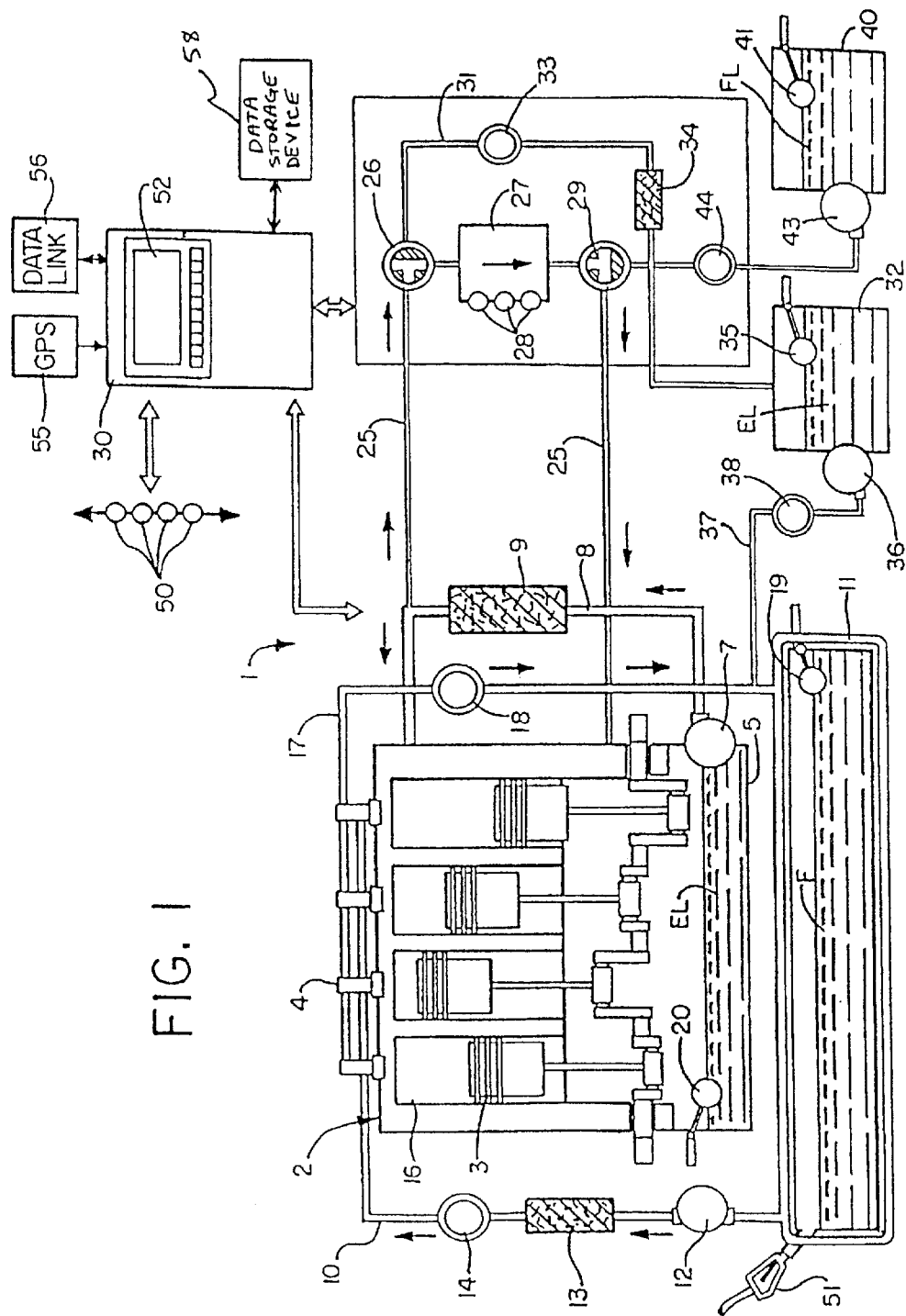
FIG. 1 is a schematic illustration of a lubrication system employed in accordance with aspects of the present invention in which a portion of a pressurized engine lubricant is shown being diverted through a flow path containing a diagnostic cell and then returned to an engine lubricant sump.

Referring now in detail to the drawings, and initially to FIG. 1, there is schematically shown one preferred embodiment of an continuous on-board diagnostic lubricant monitoring system 1 in accordance with the present invention for maintaining the quality and level of lubricant EL (e.g., an oil including additives and base material) in an internal combustion engine 2, which may for example be a diesel engine used to power a railroad locomotive. The engine 2 is schematically shown in section in FIG. 1 with the usual pistons 3, fuel injectors 4, and engine lubricant sump 5 containing the engine lubricant EL. Also, an engine driven lubricant pump 7 is shown which, when driven by the engine 2, causes the engine lubricant EL to flow from the sump 5 through an external lubricant line 8 containing a filter 9 and onto the moving parts of the engine to minimize friction and wear. The engine lubricant EL then returns to the sump 5 for recirculation through the fluid line 8 and onto the engine parts as before.

The lubricant EL within the engine sump 5 is typically near atmospheric pressure, whereas the lubricant in the fluid line 8 external to the engine 2 is at a significantly higher pressure, for example on the order of 30 psi or greater.

Also shown in FIG. 1 is the fuel line 10 through which fuel F is pumped from a fuel tank 11 by a fuel pump 12 through a fuel filter 13 and a meter 14 to the fuel injectors 4 of the engine during engine operation. Depending on the throttle position of the engine, each injector 4 injects metered amounts of fuel into the combustion chambers 16 at very high pressures. The excess fuel serves to cool the injectors 4 and is returned to the fuel tank 11 through a common line 17 containing a fuel meter 18. Preferably, level sensors 19, 20 are employed in both the fuel tank 11 and engine sump 5 to roughly determine the liquid volume in each of these reservoirs.

For determining and monitoring the quality of the engine lubricant EL, the system 1 includes a fluid conduit 25 connected to the high pressure engine lubricant line 8 upstream of the engine lubricant filter 9. Conduit 25 contains a three-way valve 26 which, in the normal "off" state shown in FIG. 1, directs a portion of the pressurized engine lubricant EL through a diagnostic manifold or cell 27 containing a plurality of sensors 28 for measuring certain physical characteristics of the engine lubricant EL, for example, the temperature, pressure, permittivity and/or viscosity of the engine lubricant EL. Downstream of the diagnostic cell 27 is another three-way valve 29 which, in the normal "off" state, returns the portion of the engine lubricant passing through the diagnostic cell 27 to the engine lubricant sump 5 through the conduit 25.

The fluid conduit 25 is sized to restrict the rate of engine lubricant flow through the diagnostic cell 27 to a relatively small amount, for example approximately three percent of the total flow output of the engine lubricant pump 7, which is considered insignificant to the proper lubrication of the engine 2.

A system controller 30, comprising, e.g., a computer, microprocessor or the like, monitors the outputs from the sensors 28 in the diagnostic cell 27 (and possibly others as described hereafter) to diagnose the engine lubricant EL, detect selected conditions, and/or determine the engine lubricant quality based on control algorithms. In response to the diagnosis made, the condition detected, and/or the determined level of lubricant quality, desired actions can be taken.

Figure 2:
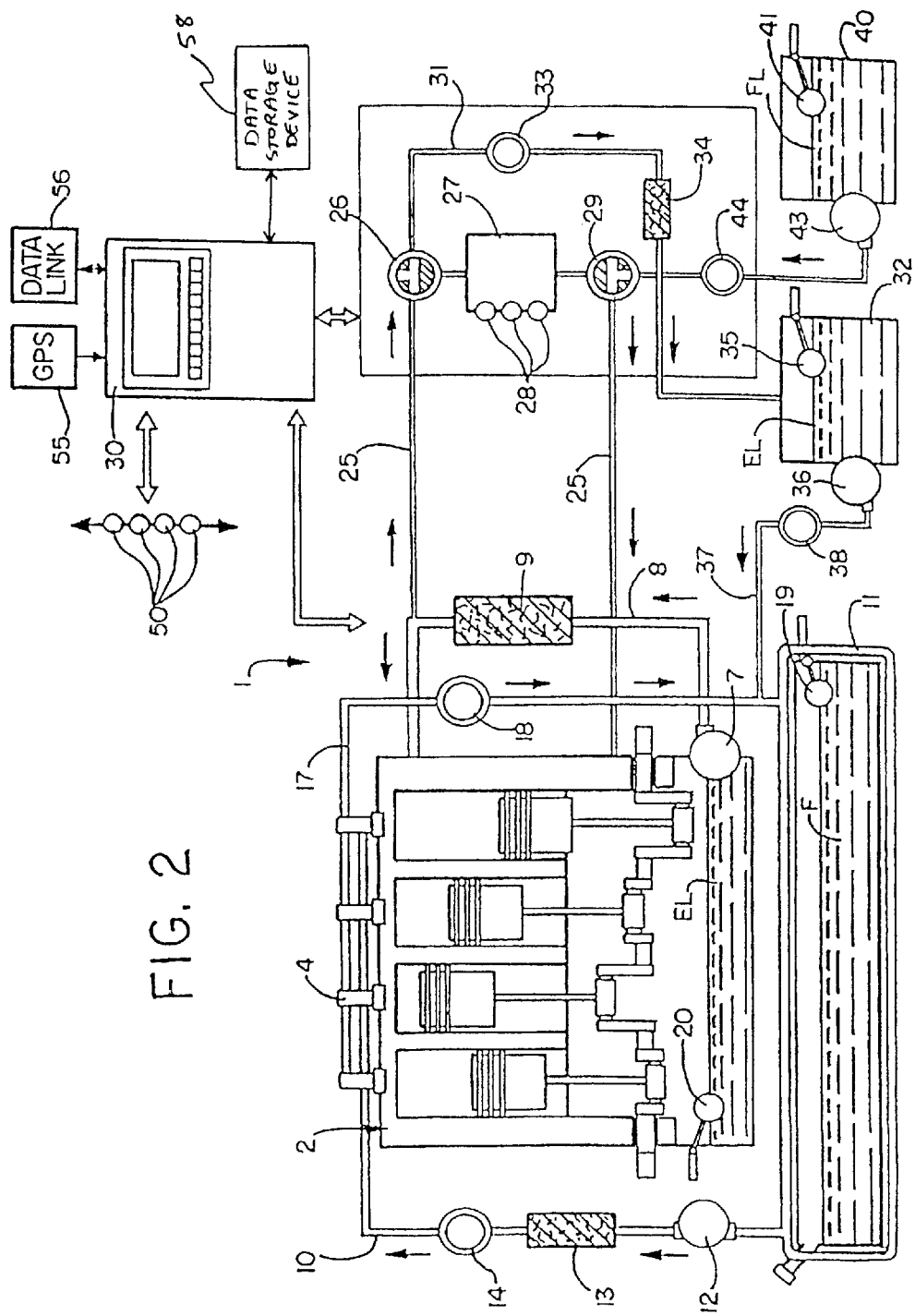
FIG. 2 is a schematic illustration of the system of FIG. 1 but showing pressurized engine lubricant being diverted into a lubricant reservoir and then into an engine fuel tank, and fresh lubricant being added to the engine lubricant sump through a flow path downstream of the diagnostic cell.

In a preferred embodiment, for example, when the quality of the engine lubricant EL drops below a predetermined level as ascertained by the controller 30, the controller periodically commands the valve 26 to redirect the diverted engine lubricant through another conduit 31 to a lubricant reservoir 32 as schematically shown in FIG. 2 where the engine lubricant may be stored until otherwise disposed of. A meter 33 and filter 34 are provided in the conduit 31 upstream of the lubricant reservoir 32 for metering and filtering the lubricant before entering the reservoir. Also, a level sensor 35 is preferably provided in the reservoir 32 for roughly determining the liquid volume in the reservoir 32.

If the engine 2 is of a type such as a diesel engine that can burn a lubricant-fuel mixture, a fluid pump 36 may be provided within the engine lubricant reservoir 32 for pumping a predetermined amount of the engine lubricant within the reservoir through a conduit 37 containing a flow meter 38 and into the common line 17 leading to the fuel tank 11 upon command by the system controller 30 as further schematically shown in FIG. 2.

Figure 3:
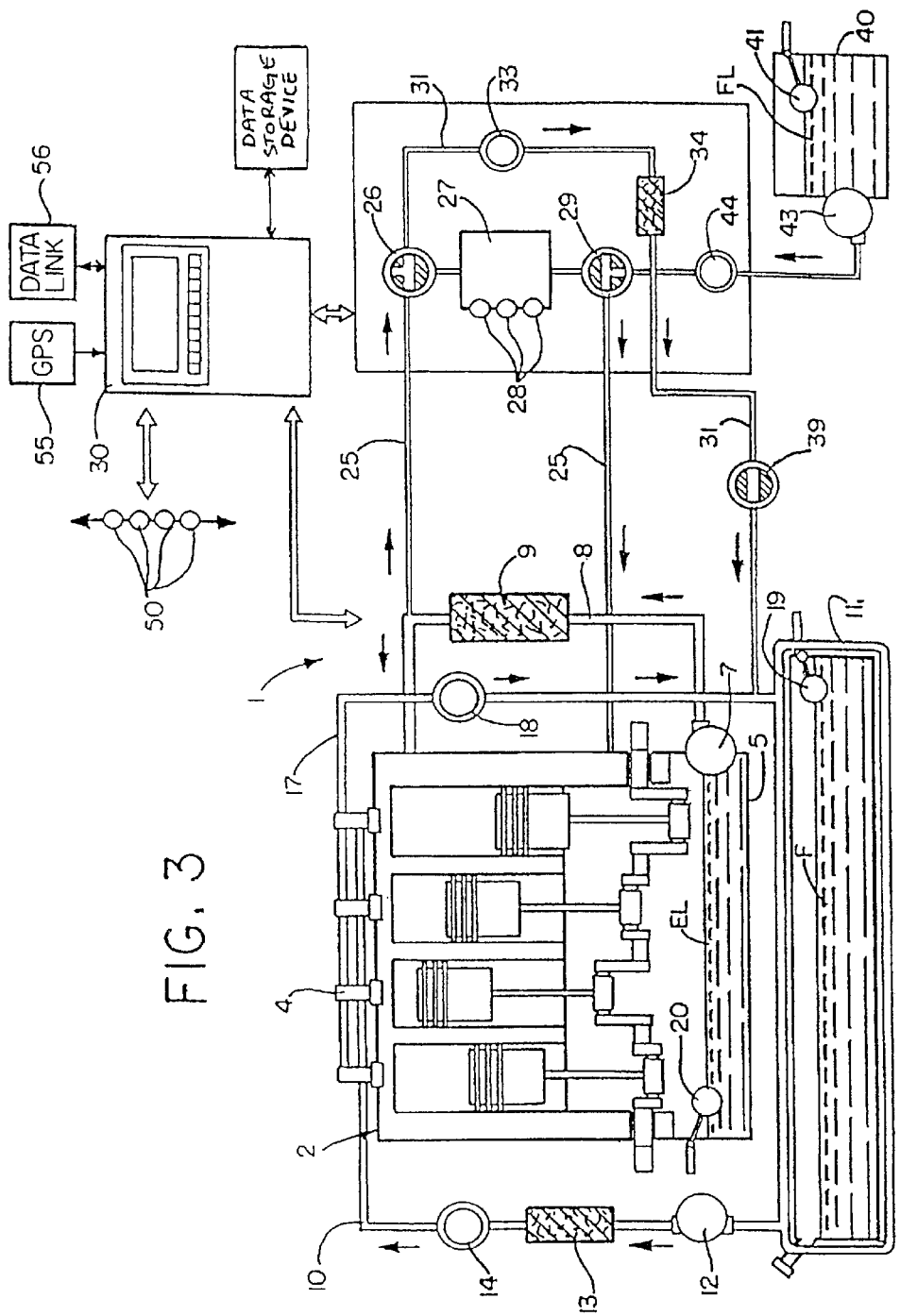
FIG. 3 is a schematic illustration of a modified lubrication system employed in accordance with aspects the present invention in which pressurized engine lubricant is diverted directly to the engine fuel tank on command of a system controller.

Alternatively, the conduit 31 that receives the redirected engine lubricant from the engine upon command of the system controller 30 may be connected directly to the common line 17 leading to the fuel tank 11 as schematically shown in FIG. 3, thus eliminating the need for the engine lubricant reservoir 32 and associated pump 36, conduit 37 and flow meter 38. In that event, a further valve 39 is desirably provided in the conduit 31 which, when activated by the system controller 30, prevents the flow of engine lubricant through the conduit 31 to the fuel tank 11 as a safety in the event the valve 26 should fail and the fresh lubricant pump 43 (described hereafter) is not operating.

However, storing the engine lubricant EL in a reservoir 32 prior to adding the engine lubricant EL to the fuel tank 11 has the advantage that periodic activation of the valve 26 to remove some of the engine lubricant EL from the engine 2 does not have to coincide with its deposit into the fuel tank 11 or fueling of the fuel tank 11. Also, the amount of engine lubricant EL that is removed from the engine 2 at any given time can be greater than the maximum amount that could be added to the fuel tank 11 at that time without exceeding a predetermined lubricant/fuel ratio for the particular engine 2.

In either case, the engine lubricant EL is preferably added to the fuel tank 11 either in conjunction with the fueling of the fuel tank 11 or as soon after fueling as possible to maximize the amount of engine lubricant EL that can be added to the fuel F without exceeding a predetermined lubricant/fuel ratio for the engine 2. Also, the engine lubricant EL is desirably added to the fuel tank 11 through the common line 17 only while the engine 2 is operating so that the engine lubricant EL will be mixed with the warm, relatively rapidly flowing fuel F returning from the injectors 4 to the fuel tank 11.

The system 1 also includes a reservoir 40 containing fresh lubricant FL for use in maintaining the desired quality and level of engine lubricant EL within the engine lubricant sump 5. In a preferred embodiment, a sensor 41 is provided in the reservoir 40 for roughly determining the volume of fresh lubricant FL within the reservoir 40. The fresh lubricant reservoir 40 is desirably selectively connected to the same conduit 25 through which the diverted engine lubricant EL is normally recirculated back to the engine 2 by the three-way valve 29 in the conduit 25 downstream of the diagnostic manifold or cell 27. When commanded by the system controller 30, the valve 29 moves to a position blocking flow of engine lubricant EL from the diagnostic cell 27 and allowing fresh lubricant FL to be pumped from the fresh lubricant reservoir 40 by a pump 43 within the reservoir through a meter 44 into the conduit 25 downstream of the diagnostic cell 27 and into the engine 2 as schematically shown in FIGS. 2 and 3.

In operation, the system controller 30 monitors the sensors 28 in the diagnostic cell 27, the level sensors 35 and 41 in the lubricant reservoirs 32 and 40, the flow meter 33 for measuring the rediverted flow of engine lubricant EL to the lubricant reservoir 32 or to the fuel tank 11, and the flow meters 38 and 44 for measuring the outflows from the lubricant reservoirs 32 and 40. Also, the system controller 30 may be used to monitor other components which include the lubricant level sensor 20 in the engine lubricant sump 5, the fuel level sensor 19, and possibly the fuel meters 14 and 18 as well as other sensors 50 mounted in conjunction with or on the engine 2, schematically shown in the drawings, for measuring such engine parameters such as engine usage based on one or more operating variables of the engine 2 or of the equipment powered by the engine 2 including the number of engine starts, engine running time, number of miles driven, amount of fuel F used since the last fresh lubricant addition, etc.

Based on the monitored sensors and/or components, the system controller 30 determines when to activate the valve 26 to redirect a portion of the lubricant EL from the engine 2 to the lubricant reservoir 32 (or directly to the engine fuel tank 11 if no lubricant reservoir is provided), and when to activate the valve 29 and pump 43 in the fresh lubricant reservoir 40 to transfer fresh lubricant FL to the engine sump 5 to maintain the quality and level of the lubricant in the engine 2. Also based on monitored sensors and/or components, the system controller 30 determines when and the amount of fuel F added to the engine fuel tank 11 through a nozzle 51, schematically shown in FIG. 1, and activates the pump 36 (if the engine lubricant reservoir 32 is included in the system) to add filtered engine lubricant EL from the reservoir 32 to the fuel tank 11 in an amount not to exceed a predetermined lubricant/fuel ratio, or until the engine lubricant reservoir 32 is empty. As previously indicated, the engine lubricant EL is preferably added to the fuel tank 11 either in conjunction with the fueling or as soon thereafter as possible, but preferably only while the engine 2 is operating so that the engine lubricant EL is mixed with the warm, rapidly flowing fuel F returning from the injectors 4 to the fuel tank 11 through the common line 17.

Of course, if the system 1 does not include a engine lubricant reservoir 32, and the redirected engine lubricant EL is added directly to the fuel tank 11 as schematically shown in FIG. 3, the system controller 30 would preferably not activate the valve 26 to redirect the engine lubricant EL to the engine fuel tank 11 except in conjunction with the fueling or as soon after fueling as possible, and preferably only while the engine 2 is operating for the reasons previously described.

Also based on monitored sensors and/or components, the system controller 30 determines when to activate the valve 29 for blocking the flow of diverted engine lubricant EL through the diagnostic cell 27 and the pump 43 in the fresh lubricant reservoir 40 to transfer fresh lubricant FL into the engine 2.

The system controller 30 optionally includes a display 52 that allows visual output of the monitored sensors and/or components. Volatile and/or non-volatile on-board storage devices 58 (e.g., magnetic storage devices or disk drives, computer memory, etc.) are used to maintain current and historical data logs or records of the measured engine, system and lubricant characteristics.

The system controller 30 may also be used to keep track of the engine location via a Global Position Satellite (GPS) unit 55. In addition, the system controller 30 may be used to communicate the data that it receives from the sensors and/or components and/or data from the storage devices 58 to a remote site through a data link 56 such as a satellite communications modem, a cellular network, or the like. Depending on the data type, it is optionally communicated continuously to the remote site and/or at predetermined or selected periodic intervals. Additionally, specific data may be communicated immediately upon receiving a demand or request therefor from the remote site. In certain circumstances, a data communication may be initiated by the system controller 30, e.g., when a condition is detected or diagnosis made indicative of incipient failure.

Note the various lubricant flow meters 33, 38 and 44 and fuel flow meters 14 and 18 would be redundant if the lubricant and fuel level sensors 20, 35, 41 and 19 were highly accurate. However, in the usual case, such level sensors only provide relatively rough measurements of the liquid volume in the sump 5, reservoirs 32 and 40 and tank 11, which are sufficient to maintain proper lubricant level in the engine 2, to limit the lubricant to fuel ratio in the fuel tank 11, to prevent the removal of lubricant EL from the engine 2 if there is not sufficient fresh lubricant FL in the fresh lubricant reservoir 40 to replace the removed amount, and to prevent the removal of lubricant EL from the engine 2 if there is not sufficient volume to receive the lubricant in the lubricant reservoir 32.

With respect to the diagnostic cell 27, at least one of the sensors 28 incorporated therein is preferably a permittivity sensor which operates at a defined frequency. The permittivity measurements obtained from the permittivity sensor are related to the amount of general polarized materials or species in the lubricant EL. Typically, the lubricant EL is characterized by a natural or synthetic oil including polar additives and non-polar base material. As the additives degrade, the polarity tends to increase. Additionally, as combustion by-products or water/moisture or coolant enter the lubrication system, the polarity also increases. In this manner then, incipient failure of the lubricant EL due to water or coolant contamination can be diagnosed in part by monitoring the permittivity of the lubricant EL. Additionally, a time to a condemning limit for the engine lubricant EL may also be predicated on permittivity monitoring.

Permittivity is a temperature dependent characteristic of the lubricant EL. Accordingly, a temperature sensor (e.g., a thermocouple or the like) is also preferably included among the sensors 28 incorporated in the diagnostic cell 27 to take measurements of the engine lubricant's temperature concurrently with each permittivity measurement.

Using the obtained permittivity measurements and the obtained temperature measurements, incipient failure of the engine lubricant EL due to water leaks and it's time to condemning limit can be determined or diagnosed. In response thereto, appropriated corrective or other actions are optionally taken as desired, e.g., an engine shut-down may be in order, engine servicing may be scheduled and/or performed including a lubrication change, fresh lubricant FL from the reservoir 40 may be added, or used engine lubricant EL may be removed and routed to the reservoir 32 if available. In this manner then, the engine is protected from the hazards of lubricant failure and/or degradation while maximizing the engine's operation time between servicing.

Alternately, the calculations and/or algorithms (described below) are perform on-board by the system controller 30, or data is off-loaded via the data link 56 to a remote site where the calculations are performed, or some combination of both. In any event, the calculation results, desired instructions or warnings based thereon, related data, and the like are preferably communicated to the engine operator, maintenance personnel or other interested parties, e.g., via the visual display 52 or other like indicators. Where the calculations where carried out at least in part at the remote site, the results or other data are optionally up-loaded over the data link 56. Additionally, the data, intermediate or final calculation results, related information and the like are optionally stored on-board in one or more of the storage devices 58.

Figure 4:
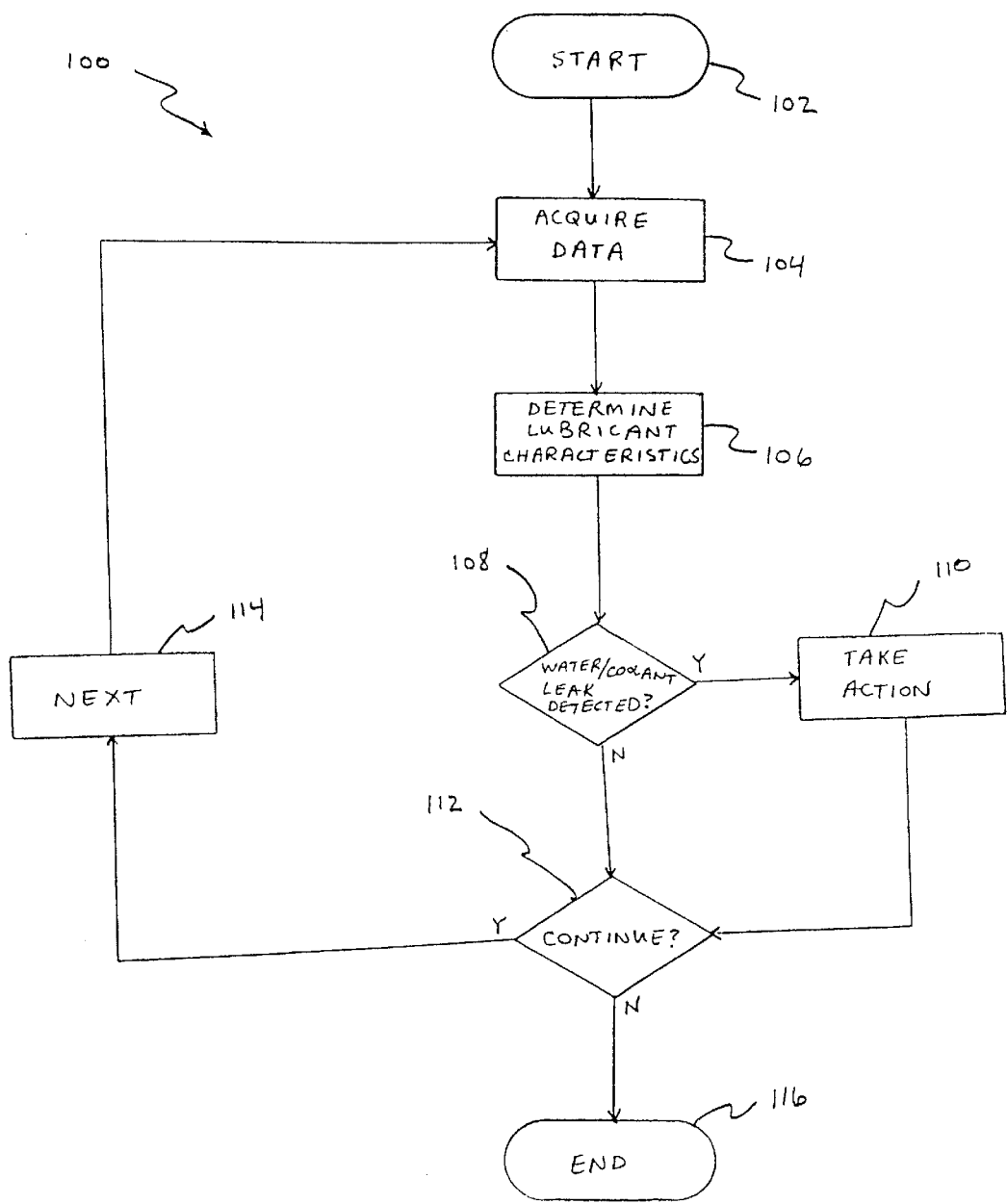
FIG. 4 is a flow chart showing a process for detecting incipient lubrication failure due to water/coolant contamination in accordance with aspects of the present invention.

The incipient failure determination or diagnosis due to water/coolant leaks or contamination is now described by way of example, with reference to FIG. 4 which is a box diagram illustrating the same. The incipient failure diagnostic process is alternately carried out via software implementation, hardware implementation or a combination of both.

The incipient failure diagnosis due to a water/coolant leak or contamination, which process is generally indicated by reference numeral 100, begins at start box 102 where initialization takes place. In addition to optional system, sensor, or other fault checking and/or calibration, initialization preferably includes the setting of certain parameters including thresholds and other values used in the incipient failure diagnosis 100 such as, e.g., the parameters n1, n2, perm_slope_limit, temp_slope1_limit, and temp_slope2_limit (described hereafter). Setting of the parameters may be predetermined and/or fixed and their values optionally stored in one or more of the storage devices 58 or otherwise. Alternately, the parameter values are variable, and they may be manually entered, supplied by the remote site, or otherwise selected. In one preferred embodiment, the parameter values are obtained from a look-up table or other like source based on the engine type, the lubrication type, and/or other like factors. In any event, the assigned parameter values are preferably based on historical observations and data related to incipient failure of lubricants due to water/coolant leaks. Additionally, the assigned parameter values are preferably set to optimally tune the incipient failure diagnosis 100 for specific applications or circumstances.

The next step 104 is to acquire a set of measurements or data. The diagnostic process 100 is preferably a continually updated iterative process with each iteration employing a set of data values representing the most recent permittivity data and the most recent temperature data. Alternately, each data point may represent an individual measurement or an average or otherwise weighted measurement taken over time. In a preferred embodiment, the acquired data is "minute data." Minute data is the result of a number of measurements taken at intervals (e.g., 1 second intervals) over the period of 1 minute, which measurements are averaged to obtain the data value for that minute. Minute data for consecutive 1 minute periods is then acquired approximately concurrently for both permittivity and temperature. A complete data set for any one given iteration preferably includes n1 of the most recent permittivity values and n2 of the most recent temperature values, where n1 and n2 are integers greater than zero and n2>n1. In a preferred embodiment, for example, n1=5 and n2=20.

As it is acquired, the data may be stored in one or more of the storage devices 58. Once the first complete set of data has been acquired, the diagnostic process 100 may continue. Thereafter, subsequent iterations are carried out after each acquisition of the next permittivity value and its corresponding temperature value. That is, with each update the oldest data values used in the immediately preceding iteration are now disregarded, the remaining other data values are shifted or re-indexed accordingly, and the newly acquired data values placed into the current iteration positions. In this manner then, when "minute data" is employed, the incipient failure diagnosis is updated every minute after the first iteration. Optionally, to conserve storage room, only the n1 most recently acquired permittivity values and the n2 most recently acquired temperature values are saved, and with each update the oldest of both are discarded, deleted or written over.

At the next step 106, the acquired set of data undergoes processing and/or calculations are made based thereon to determine certain characteristics of the engine lubricant EL. In particular, a rate of change of the lubricant's permittivity, a "short" term rate of change of the lubricant's temperature, and a "long" term rate of change of the lubricant's temperature are preferably determined. The "long" and "short" terms are relative to one another, with the short term preferably relating to the time in which the n1 most recent data values were acquired, and the long term preferably relating to the time in which the n2 most recent data values were acquired. For exemplary purposes herein, the rate of change of the lubricant's permittivity is nominally termed "slope1," the short term rate of change of the lubricant's temperature is nominally termed "slope2," and the long term rate of change of the lubricant's temperature is nominally termed "slope3."

In a preferred embodiment, the data used for determining or calculating slope1 are the n1 most recently acquired permittivity values, the data used for determining slope2 are the n1 most recently acquired temperature values, and the data used for determining slope3 are the n2 most recently acquired temperature values. Each of the three characteristics are preferably determined or calculated by initially centering the respective data, i.e., subtracting the mean from each value. The centered values for each calculation are then regressed, preferably, using a least-squares fit or other linear regression. Where the data was acquired at regular intervals, the centered values are regressed against integer values representing the relative order of the data values' acquisition. Finally, the slope of each regression is taken as the corresponding value for slope1, slope2, and slope3, respectively.

In a preferred embodiment, the algorithm or calculation used to determine each of slope1, slope2, and slope3 is mathematically given by:

$$slopeN = \frac{n\sum_{i=1}^{n} x_i y_i - \sum_{i=1}^{n} x_i \sum_{i=1}^{n} y_i}{n\sum_{i=1}^{n} x_i^2 - n\left[\sum_{i=1}^{n} x_i\right]^2}, \quad (1)$$

where slopeN represents slope1, slope2, or slope3 for the respective calculations, n represents the total number of data points in each of the respective calculations (i.e., n=n1 for the calculations of slope1 and slope2, and n=n2 for the calculation of slope3), $x_i$ represents the integers from 1 to n, and $y_i$ represents the respective data values for each of the calculations (i.e., $y_i$ represents the acquired permittivity data for the calculation of slope1, and $y_i$ represents the acquired temperature data for the calculations of slope2 and slope3).

At determination step 108, after the engine lubricant characteristics (i.e., slope1, slope2, and slope3) have been evaluated, it is determined whether or not a water or coolant leak is contaminating the engine lubricant EL. In a preferred embodiment, the determination is carried out by comparing the engine lubricant characteristics to various thresholds, i.e, perm_slope_limit, temp_slope1_limit, and temp_slope2_limit. Preferably, water or coolant contamination is deemed to exist if the following three conditions are met: (1) slope1>perm_slope_limit; (2) |slope2|<temp_slope1_limit; and (3) slope3<temp_slope2_limit. Otherwise, if all three are not met, water or coolant contamination is deemed not to exist. In a preferred embodiment, for example, perm_slope_limit=0.001, temp_slope1_limit=0.37, and temp_slope2_limit=0.80.

With respect to the three conditions mentioned above, condition (1) relates to the rate of change of the lubricant's permittivity, and meeting condition (1) means that the rate of change of the lubricant's permittivity is excessive or high compared to the threshold level set, perm_slope_limit. This is possibly indicative of water or coolant contamination. However, permittivity is a temperature dependent characteristic or measurement. Accordingly, it is undesirable to rely solely on the rate of change of the lubricant's permittivity which may be affected by temperature changes, and not truly to due to water or coolant contamination. To compensate for temperature changes, conditions (2) and (3) must also be met in order for a contamination or leak condition to be positively identified. Meeting condition (2) indicates that the lubricant's temperature is in control and not changing rapidly or greatly during the period in which the permittivity data was acquired, i.e., the short term rate of change of the lubricant's temperature is small relative to the threshold set, temp_slope1_limit. Out of control temperature may be experienced, e.g., when the engine 2 is shutting down. Meeting condition (3) indicates that the lubricant temperature is not ramping up, i.e., the long term rate of change to the lubricant's temperature is below the threshold set, temp_slope2_limit. Excessive temperature ramping may be experienced, e.g., when the engine 2 is rapidly advancing through its notches, or the speed of operation is rapidly increased.

By meeting conditions (2) and (3) then, it can be concluded that any observed changes in the permittivity of the engine lubricant EL over a prescribed level or threshold are attributable to water or coolant contamination. That is to say, when the immediate temperature is in control and it has not been ramping up over time, rising permittivity can be safely attributed to water or coolant contamination. Accordingly, when condition (1) is also met, a contamination or leak condition is deemed to exist. In this manner, temperature is compensated for in the determination process.

If a water or coolant leak is deemed to exist at decision step 108, then the process 100 branches to step 110 where desired corrective or otherwise responsive actions are taken. Otherwise, if no-leak is deemed to exist, the take action step 110 is skipped. Of course, various actions or combinations or actions may be taken upon the detection of a water/coolant leak. Preferably, the desired actions taken at step 110 include one or more of: notifying the engine's operator of the detected leak, e.g., via the display 52 or other perceivable indicators; communicating the detected leak condition and associated data to the remote site, e.g., via the data link 56; where the detected leak is sufficiently serious, automatically shutting down the engine 2, either immediately or within a prescribed time period; scheduling the engine 2 for service; exchanging old engine lubricant EL with fresh lubricant FL; etc.

Next, at decision step 112, it is decided whether or not the process 100 should continue. If the process 100 should continue, it branches back to the acquisition step 104 by way of re-indexing step 114 for the next iteration of the process 100. Otherwise, the process 100 ends at step 116. Preferably, the process 100 continues automatically as long as the engine 2 is in operation. Optionally, the process 100 is engaged and/or disengaged as desired by the operator or otherwise, perhaps, via a query or command received from the remote site over the data link 56.

If the process 100 is continued, subsequent iterations are carried out with updated data. The data is preferably updated in the re-indexing step 114. With each update the oldest data values used in the immediately preceding iteration are disregarded, and the remaining other data values are shifted or re-indexed accordingly. Consequently, any newly acquired data values may be placed into the current iteration positions.

Please note that the foregoing discussion of the incipient failure diagnosis 100 preferably relates to railroad applications, i.e., engines such as those employed in railroad locomotives. Other applications are contemplated, such as mining machinery and other off-highway vehicles, that use like incipient failure diagnostic processes which are tailored to the particular application. For example, in the case of a preferred embodiment for a mine vehicle, the process is tailored as follows: rather than using all three lubricant characteristics (i.e., slope1, slope2, and slope3) only slope1 and slope2 are used and a substitute third characteristic, the minimum lubricant temperature (nominally termed minT), is used; conditions (1), (2) and (3) are rewritten as slope1>perm_slope_limit, |slope2|<temp_slope1_limit, and minT>temp_mim_limit (i.e., the minimum lubricant temperature is greater than the threshold parameter temp_mim_limit); and the thresholds are set as perm_slope_limit=0.06, temp_slope1_limit=0.25, and temp_min_limit=50° C. Of course, in still other applications, the incipient failure diagnostic process is optionally tailored differently for optimum performance therein. In any event, the processes similarly compensate for the temperature dependent nature of the permittivity characteristic or measurement. Optionally, a variable diagnostic process is employed which is tunable or tailored to the particular application in which it operates, or alternately, a fixed diagnostic process is employed in which the process branches to different sub-processes or algorithms based on the application.

In one preferred alternate embodiment, using the temperature measurements, the corresponding permittivity data values acquired are normalized to a selected standard temperature based on the temperature response of the sensor. In this way, the permittivity data is temperature compensated, and resulting changes in permittivity over a threshold level may be attributed to water/coolant contamination.

Figure 5:
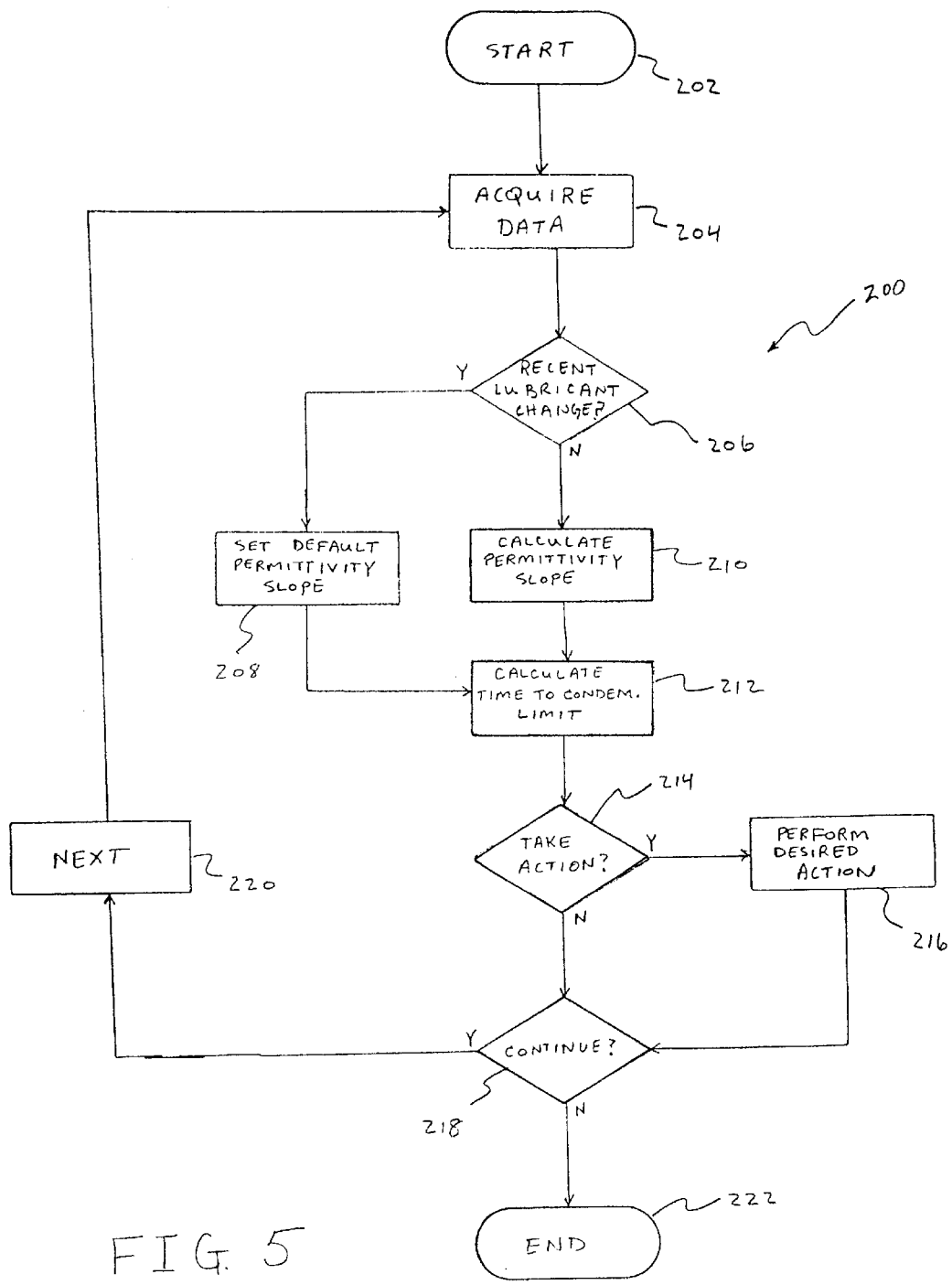
FIG. 5 is a flow chart showing a process for determining a lubricant's time to condemning limit base on permittivity monitoring in accordance with aspects of the present invention; and, FIG. 6 is a flow chart showing a process for lubrication diagnosis based on viscosity monitoring in accordance with aspects of the present invention.

The time to condemning limit calculation or algorithm is now described by way of example, with reference to FIG. 5 which is a box diagram illustrating the same. Again, this process is alternately carried out via software implementation, hardware implementation or a combination of both. The time to condemning limit process is used to determine the amount of time left until the lubricant quality is degraded below a predetermined or otherwise selected level. This degradation is consistent with normal operation of the engine 2 and is a consequence of, e.g., depletion of lubricant additives, ingestion into the lubricant of foreign materials (i.e., dirt from the surrounding environment, wear materials from the engine, and/or blow-by from the combustion process), break-down of the base stock of the lubricant, etc. In this manner, it is determined how much remaining useful life (RUL) the engine lubricant EL has left.

The time to condemning limit is based on the monitored permittivity of the lubricant EL over time, and is preferably determined or calculated from hourly medians of the minute permittivity data, nominally termed hourly permittivity data. That is, each consecutive one hour time interval is assigned a permittivity value based on the median of the minute data for that hour. In turn, based on changes in the hourly permittivity data over time, a determination is made as to the amount of useful life left in the engine lubricant EL.

The time to condemning limit determination process, which process is generally indicated by reference numeral 200, begins at start box 202 where initialization takes place. In addition to optional system, sensor, or other fault checking and/or calibration, initialization preferably includes the setting of certain parameters including thresholds and other values used in the time to condemning limit determination process 200 such as, e.g., the parameters shift_limit, default_slope, min_data, max_data, m, cond_limit, etc. (described hereafter). As before, setting of the parameters may be predetermined and/or fixed and their values optionally stored in one or more of the storage devices 58 or otherwise. Alternately, the parameter values are variable, and they may be manually entered, supplied by the remote site, or otherwise selected. In one preferred embodiment, the parameter values are obtained from a look-up table or other like source based on the engine type, the lubrication type, and/or other like factors. In any event, the assigned parameter values are preferably based on historical observations and data related to lubrication degradation. Additionally, the assigned parameter values are preferably set to optimally tune the process 200 for specific applications or circumstances.

The next step 204 is to acquire the hourly permittivity data. Again, the process 200 is iterative and consecutive hourly permittivity values are acquired as long as the process or algorithm continues to run. As it is acquired, the data may be stored in one or more of the storage devices 58. The maximum number of hourly permittivity values used in the process 200 is given by max_data, an integer value greater than 1. For example, in a preferred embodiment, max_data=168, which is 7 days of hourly permittivity data. Max_data defines the largest desired window of hourly permittivity data used in calculating the permittivity slope (described below). Accordingly, as data in excess of max_data is acquired, the oldest acquired data value is disregarded (optionally, deleted or written over), the remaining values re-indexed accordingly, and the newly acquired data value is placed in the current iteration position.

Next, at decision step 206, it is determined if the lubricant had been changed or significantly topped-off recently. This is preferably accomplished by looking for jumps or shifts in the hourly permittivity data which exceed a predetermined or otherwise selected threshold, shift_limit. That is, when the difference between hourly permittivity data from adjacent acquisitions exceeds the shift_limit, it indicates that the lubricant was changed or significantly topped-off between those acquisitions. For example, in one preferred embodiment, shift_limit=0.035 permittivity units.

The change or top-off is deemed to be sufficiently recent if less than a certain threshold number of acquisitions have been made since the most recent top-off or change. This threshold is nominally given as min_data, where min_data is an integer number less than max_data. For example, in one preferred embodiment, min_data=72, which is 3 days of hourly permittivity data. In this manner, min_data defines the smallest desired window of hourly permittivity data used in calculating the permittivity slope (described below). Accordingly, if the difference between any two adjacently acquired hourly permittivity values within the min_data most recently acquired values is greater than shift_limit, then a lubrication change or significant top-off is deemed to have recently occurred, otherwise no lubrication change or significant top-off is deemed to have recently occurred.

If at decision step 206, a change or significant top-off is deemed to have recently occurred, the process 200 branches to step 208, otherwise the process continues on to step 210. At step 208, the permittivity slope, perm_slope, is set to a default value, default_slope. For example, in one preferred embodiment, default_slope=0.0004. The permittivity slope as use here is representative of the rate of over-all quality degradation for the lubricant. The permittivity slope is set to the default value when there is insufficient hourly permittivity data acquired since the last change or top-off to reliably determine the actual rate of over-all quality degradation for the engine lubricant EL. Accordingly, it is assumed to be the default rate and so set at step 208. On the other hand, if there is sufficient hourly permittivity data acquired since the last change or top-off to reliably determine a rate of over-all quality degradation, it is done so at step 210.

If the number of acquisitions since the last lubricant change or significant top-off is greater than max_data, then the max_data most recent hourly permittivity values are used to calculate the permittivity slope, otherwise all the hourly permittivity values since the last lubricant change or significant top-off are used to calculate the permittivity slope. Note, in the latter case, there are at least min_data hourly permittivity values used in the slope calculation. That is to say, the hourly permittivity values within a sampling window are used to determine the permittivity slope, where the window has a maximum width of max_data and a minimum width of min_data. The window extends from the most recently acquired hourly permittivity value back to the most recent lubrication change or significant top-off or alternately back to the max_data width, which ever is smaller. In any event, the permittivity slope is then preferably calculated by averaging the differences between adjacent hourly permittivity values within the window. With each new or updated acquisition or iteration, the window slides forward by one hourly permittivity value.

Optionally, the data in the window is filtered or conditioned prior to calculating or otherwise determining the permittivity slope in step 210. In one preferred embodiment, a portion of the data having extreme values is disregarded for purposes of the permittivity slope calculation. For example, when the hourly permittivity data is sorted by value from highest to lowest or vice versa, 10% of the data on both ends thereof may be discarded or otherwise not considered for purposes of the permittivity slope calculation. In this manner, extreme and potentially anomalous data does not influence the permittivity slope determination.

After the permittivity slope has been calculated in step 210 or set to the default value in step 208, the time to condemning limit, time_to_cond_limit, is determined or calculated at step 212. Mathematically, the time to condemning limit is preferably calculated as follows: if the current permittivity is less then the condemning limit, then:

$$\text{time\_to\_cond\_limit} = \frac{\text{cond\_limit} - \text{current\_perm}}{\text{perm\_slope}}; \qquad (2)$$

otherwise:

$$\text{time\_to\_cond\_limit} = 0 \qquad (3);$$

where, time_to_cond_limit represents a determination of the time remaining until the condemning limit is reached; cond_limit is the condemning limit, a parameter representing the permittivity of the lubricant when it has reached its condemning limit (i.e., when it has reached the end of its useful life); current_perm represents the current permittivity of the engine lubricant EL; and, perm slope represents the previously determined permittivity slope or rate of quality degradation for the engine lubricant EL, be it default or calculated.

Preferably, the current permittivity, current_Perm, is taken as the median of the m most recently acquired hourly permittivity values, where m is an integer number greater than 1 and less than min_data. For example, in one preferred embodiment, m=4. Optionally, if there has been a lubricant change or significant top-off within the time period of the m most recently acquired hourly permittivity values, less than m data values may be used to determine the current permittivity. Alternately, the time to condemning limit calculation may be postponed until at least m hourly permittivity data values have been acquired since the last lubrication change or significant top-off.

Based on the time to condemning limit as determined in step 212, at decision step 214 it is determined if any desired actions are to be taken. For example, depending upon how low the time to condemning limit is, particular actions are taken. In one preferred embodiment, if the time to condemning limit is less than or equal to 5 days for a railroad locomotive or less then or equal to 2 days for other off-highway vehicles, then optionally this information is communicated via the data link 56 to the remote location. If an action is to be taken, then the process 200 branches to step 216 where desired corrective or otherwise responsive actions are taken. Otherwise, if no action is to be taken, step 216 is skipped. Of course, various actions or combinations or actions may be taken as desired. Preferably, the desired actions taken at step 216 include one or more of: notifying the engine's operator of the time to condemning limit, e.g., via the display 52 or other perceivable indicators; communicating the time to condemning limit and associated data to the remote site, e.g., via the data link 56; where the detected leak is sufficiently low, e.g., at or near zero, automatically shutting down the engine 2, either immediately or within the time period before the condemning limit is reached; scheduling the engine 2 for service; exchanging old engine lubricant EL with fresh lubricant FL; etc.

Next, at decision step 218, it is decided whether or not the process 200 should continue. If the process 200 should continue, it branches back to the acquisition step 204 by way of re-indexing step 220 for the next iteration of the process 200. Otherwise, the process 200 ends at step 222. Preferably, the process 200 continues automatically as long as the engine 2 is in operation. Optionally, the process 200 is engaged and/or disengaged as desired by the operator or otherwise, perhaps, via a query or command received from the remote site over the data link 56. If the process 200 is continued, subsequent iterations are carried out with updated data. The data is preferably updated in the re-indexing step 220. With each update the oldest data values used in the immediately preceding iteration are disregarded if they are no longer going to be employed, and the remaining other data values are shifted or re-indexed accordingly. Consequently, any newly acquired data values may be placed into the current iteration positions.

Again, with respect to the diagnostic cell 27, at least one of the sensors 28 incorporated therein is preferably a dynamic (rotational) viscocometer or other like viscosity sensor which obtains measurements related to the viscosity of the lubricant EL. With use, a lubricant's viscosity will generally tend to increase slowly in the absence of an "abnormal" event. This is due to the build-up over time of soot, insoluble oxidation products and/or other combustion byproducts in the lubricant. In this manner, viscosity is related to the quality of the lubricant. An observed increase in viscosity is indicative of quality degradation. This is particularly true for mono-grade lubricants, i.e., lubricants absent viscosity modifiers. Accordingly, in a preferred embodiment of the present invention, the engine lubricant quality is tracked in part by monitoring changes in the viscosity of the lubricant EL. A time to condemning limit for the engine lubricant EL is then predicated on the viscosity monitoring.

The condemning limit is the point at which the lubricant quality is deemed to have degraded to an unacceptably low level. The unacceptably low level is preferably defined as the level at which the lubricant is no longer sufficiently useful for one or more of its intended purposes, e.g., protecting against engine wear. When the lubricant's viscosity reaches a predetermined or otherwise selected value, it is deemed to have met the condemning limit. The time to condemning limit is therefore an indication or otherwise representative of the RUL in the lubricant.

Additionally, in a preferred embodiment, fuel contamination of the lubricant is diagnosed or detected based upon viscosity data, and as with degradation due to soot and/or combustion byproduct built-up, a time to condemning limit based on degradation due to fuel contamination is also determined. Contrary to the case of degradation due to soot and/or combustion byproduct build-up, however, lubricant degradation due to fuel contamination is marked by a decrease in viscosity.

Determining the time to condemning limit in either case, allows the operator, maintenance personnel or other interested parties to be advised as to the amount of time remaining before the unacceptable quality level is reached. They are therefore able to plan accordingly, and take desired corrective or otherwise responsive actions prior to exceeding the condemning limit. Likewise, by detecting for fuel contamination, lubricant failure and/or the attendant consequences of excessive lubricant degradation caused thereby are avoidable. The desired corrective or otherwise responsive actions selectively taken include, e.g., in an urgent or extreme case, shutting-down of the engine 2, scheduling and/or performing engine service including a lubrication change, adding fresh lubricant FL from the reservoir 40, or removing used engine lubricant EL and routing it to the reservoir 32, if available. In this manner then, the engine 2 is protected from the hazards of lubricant failure and/or degradation while maximizing the engine's operation time between servicing by precisely determining the appropriate time for the next service stop.

As with the permittivity, the viscosity is a temperature dependent characteristic of the engine lubricant EL. Accordingly, the temperature sensor is also preferably included among the sensors 28 incorporated in the diagnostic cell 27 to take measurements of the engine lubricant's temperature concurrently with each viscosity measurement.

Figure 6:
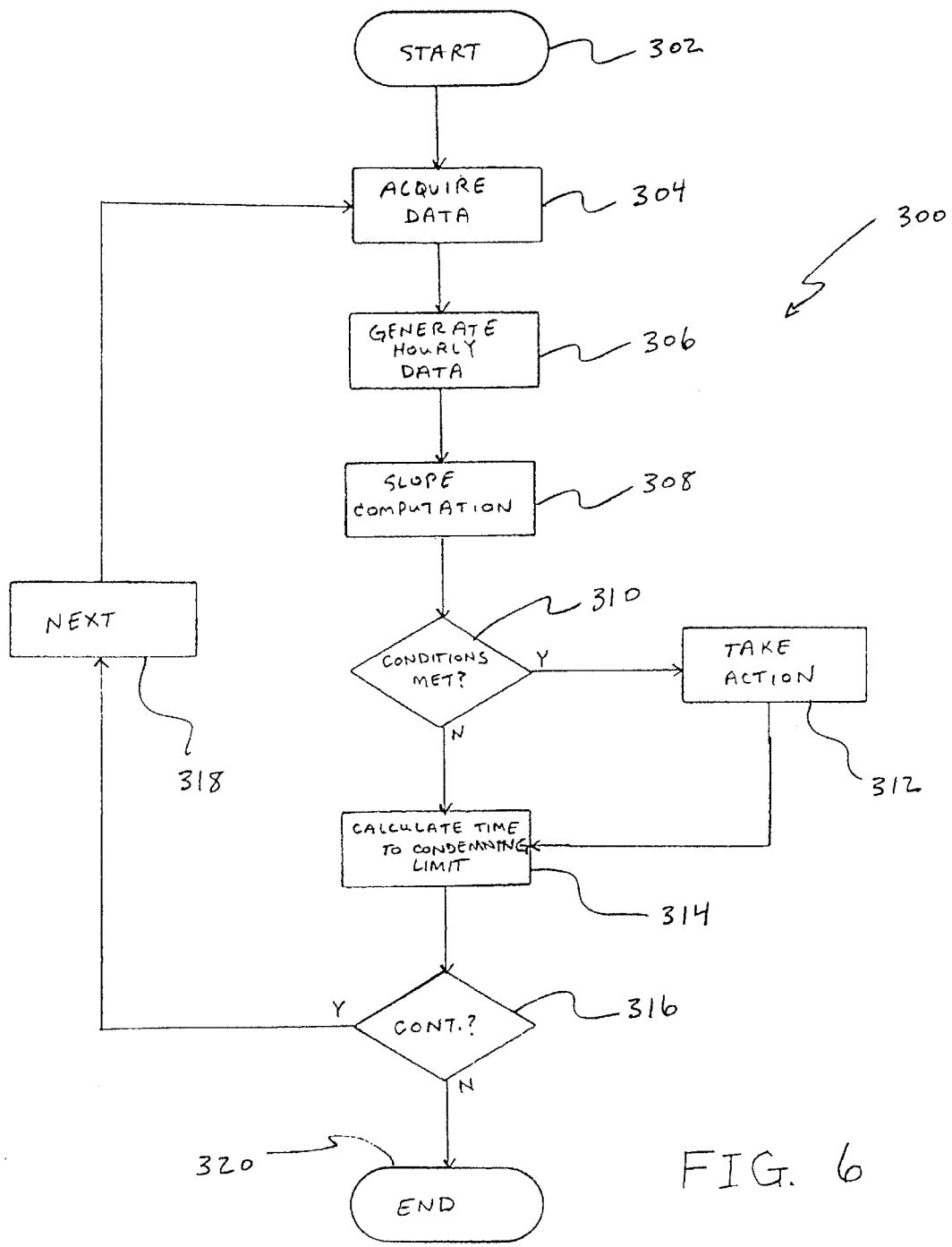

The viscosity based diagnostic process in accordance with a preferred embodiment of the present invention is now described by way of example, with reference to FIG. 6 which is a box diagram illustrating the same. The diagnostic process is alternately carried out via software implementation, hardware implementation or a combination of both.

The diagnostic process, which is generally indicated by reference numeral 300, begins at start box 302 where initialization takes place. In addition to optional system, sensor, or other fault checking and/or calibration, initialization preferably includes the setting of certain configurable parameters including thresholds and other values used in the diagnosis 300 such as, e.g., the parameters a, b, calibration__ constant, n, m, N, visc__lower1, visc__lower2, visc__lower__ limit, visc__upper, and visc upper__limit (described hereafter). Setting of the parameters may be predetermined and/or fixed and their values optionally stored in one or more of the storage devices 58 or otherwise. Alternately, the parameter values are variable, and they may be manually entered, supplied by the remote site, or otherwise selected. In one preferred embodiment, the parameter values are obtained from a look-up table or other like source based on the engine type, the lubrication type, and/or other like factors. In any event, the assigned parameter values are preferably based on historical observations and data associated with the relationship between lubricant viscosity and quality degradation and/or fuel contamination. Additionally, the assigned parameter values are preferably set to optimally tune the diagnostic process 300 for specific applications or circumstances.

The next step 304 is to acquire a set of measurements or data. The diagnostic process 300 is preferably a continually updated iterative process with each iteration employing a set of data values representing the most recent viscosity data and the most recent temperature data. Alternately, each data point may represent an individual measurement or an average or otherwise weighted measurement taken over time. In a preferred embodiment, the acquired data is minute data. Minute data for consecutive 1 minute periods is acquired approximately concurrently for both viscosity and temperature. A complete data set acquisition for a given iteration preferably includes obtaining an hour's worth of viscosity values and temperature values. With each successive iteration, the next hour's worth of viscosity data and temperature data is acquired. In this case, the diagnosis is updated hourly.

As it is acquired, the data may be stored in one or more of the storage devices 58. Once enough data has been acquired, the diagnostic process 300 may continue. In the beginning of the diagnostic process 300, there may be a certain initial latency period before enough data has been acquired to carry out all the desired calculations and/or determinations. Thereafter, subsequent iterations are carried out in accordance with each acquisition of the next hour's viscosity data and corresponding temperature data. With each update the oldest hour of data values used in the immediately preceding iteration are now disregarded, the remaining other hours of data values are shifted or re-indexed accordingly, and the newly acquired hour of data values placed into the current iteration positions. Optionally, to conserve storage room, the oldest disregarded data set in one or more of the storage devices 58 is discarded, deleted or written over. Alternately, it is saved for historical analysis, record keeping purposes, or the like.

In a preferred embodiment of the present invention, there is a linear relationship between the load experienced by the rotational viscometer's motor and the viscosity of the lubricant being monitored. Accordingly, the viscosity measurement is preferably calculated or determined from the viscometer's motor load using a calibration constant which is a configurable parameter. This can be mathematically represented as follow:

$$\text{Viscosity} = \text{motor\_load} * \text{calibration\_constant} \quad (4);$$

where, viscosity represents the measured viscosity, motor_load represents the load on the viscometer's motor, and calibration_constant represents the configurable parameter. Preferably, the viscometer is re-referenced periodically, e.g., once per year, by taking several lubricant samples from the engine 2 and analyzing them with an independent second viscometer or other like viscosity measuring sensor. If the original viscometer has experienced drift, then this shall be corrected via a configurable viscosity drift parameter.

As the viscosity will vary with temperature, the viscosity data is normalized to a common reference temperature. Temperature compensation is preferably carried out using two compensation constants which are also configurable parameters. The common reference temperature is preferably set to 100° C., because for various lubricant viscosity grades, minimum viscosity specifications are set at this temperature. Mathematically, the relationship between viscosity and temperature is of the following form:

$$\log(\log(\text{viscosity})) = a * \log(\text{temperature}) + b \quad (5);$$

where, viscosity is in centipoise, temperature is in Kelvin, a represents the viscosity-temperature slope, and b represents the viscosity intercept.

The determination and/or setting of configurable parameters is preferably carried out at start up 302. However, a and b, can vary with lubrication type and viscosity grade. Therefore, the diagnostic process 300 will optionally detect and/or determine when to re-calibrate parameters a and b by monitoring the variation of temperature compensated viscosity in relation to temperature over short time periods where the true viscosity is assumed to be constant. Initially the a and b values are read from configurable parameters, but are recalculate periodically, as necessary, or as otherwise desired. This information is optionally downloaded from time to time to the remote site over the data link 56 along with a flag indicating that the viscometer normalization equation (5) was re-calculated.

In a preferred embodiment, the viscosity normalized to the common reference temperature of 100° C. is calculated or otherwise determined from the measured viscosity obtained at the measured temperature. Mathematically, this is done by using the above equation (5) rearranged into the following form:

$$\log(\log(\text{viscosity}100)) = \log(\log \text{viscosity})) - \\ a * (\log(\text{temperature}/373.16); \quad (6)$$

or, $$\text{viscosity}100 = \exp(\exp(\log(\text{viscosity}) - a * (\log(\text{temperature}/373.16)); \quad (7)$$

where, viscosity100 represents the viscosity normalized to the common reference temperature of 100° C., viscosity represents the measured viscosity, temperature represents the corresponding measured temperature in degrees Kelvin, and degrees Kelvin=degrees Centigrade+273.16.

Accordingly, in a preferred embodiment, for each iteration of the diagnostic process 300, the acquisition step 304 involves the acquisition of an hour's worth of viscosity100 minute data and corresponding temperature minute data. That is, 60 consecutive viscosity100 data values and 60 corresponding temperature data values.

At the next step 306, "hourly" viscosity data is generated from each consecutive hour's worth of acquired minute data. The hourly viscosity data is an optionally weighted value representing the viscosity100 data for that hour. Preferably, the hourly viscosity data is the median of the minute data for that hour, and it is termed the hourly viscosity median. Additionally, it is preferred that certain acquired minute data not be included in calculating or determining the hourly viscosity median. In particular, minute data which was acquired with a corresponding temperature below a predetermined or otherwise selected temperature threshold, e.g., less than 40° C., is not considered when calculating the hourly viscosity median. It is possible then that the hourly viscosity median is calculated with less than 60 data values. However, if the number of values is not above some minimum threshold, e.g., 20 values, then no median is calculated for that hour. In this manner, if there is an insufficient amount of reliable data in any given hour, then the data for that hour is not used.

The hourly viscosity data values are preferably stored in one or more of the storage devices 58 from which they are selectively accessed. With each iteration, the hourly viscosity data is updated. That is, the oldest value previously used which is no longer going be used in the diagnostic process 300 is disregarded (optionally, deleted or otherwise discarded), the remaining values are re-indexed or shifted over accordingly, and the newly generated hourly viscosity data value entered into the current iteration position. In this manner, the hourly viscosity data is updated each hour.

At step 308, slope computations are made based on the hourly viscosity data. Preferably, a number n of the most recently established or generated hourly viscosity data values are used for the slope computations, where n is a integer value greater 1. Preferably, n=12. In a preferred embodiment, the algorithm or calculation used to determine the slope is mathematically given by:

$$\text{slope} = \frac{n\sum_{i=1}^{n} x_i y_i - \sum_{i=1}^{n} x_i \sum_{i=1}^{n} y_i}{n\sum_{i=1}^{n} x_i^2 - n\left[\sum_{i=1}^{n} x_i\right]^2}, \quad (8)$$

where slope represents the rate of change of the respective data values, n represents the total number of data points or values used in the calculation, $x_i$ represents the integers from 1 to n, and $y_i$ represents the respective data values for the calculation, i.e., the hourly viscosity data or medians.

Preferably, after each update of the hourly viscosity data, the slope is re-calculated using the updated hourly viscosity data. Accordingly, the slope is also iteratively updated. A number m of the most recently calculated slope values are preferably retained for subsequent use, where m is an integer greater than 1. As with n, preferably, m=12. In this manner then, m slopes are generated, updated hourly, with each slope being calculated on the immediately preceding n hourly viscosity data values. These collective slope values are nominally termed, for purposes herein, the "m n-hour slopes." Based on the m n-hour slopes and the hourly viscosity data, it is determined at decision step 310 if any of four separate sets of conditions are met. When a set of conditions is met, a desired action in response thereto is taken at step 312, after which a time to condemning limit is calculated or determined at step 314, otherwise, the take action step 312 is bypassed.

The conditions have a number of associated thresholds and limits where are define here for the sake of convenience. Listed here in relative order from lowest value to highest value, the thresholds and limits preferably are as follows: visc_lower_limit is the lower viscosity condemning limit for the lubricant; visc_lower2 is a second lower threshold; visc_lower1 is a first lower threshold; visc_upper is an upper threshold; and visc_upper_limit is the upper viscosity condemning limit for the lubricant.

It is generally desirable for the viscosity of an SAE 40 or 20W40 lubricant utilized in locomotive applications at 100° C. to fall between 12.5 and 16.5 centistoke (10.5 and 16.0 centipoise (cP)). However, viscosity specifications for lubricating oils used in various applications and/or engines may vary. Accordingly, in one preferred embodiment, the aforementioned limits and thresholds are assigned values as follows: visc_lower_limit=10.5 cP; visc_lower2=11.75 cP; visc_lower1=12.0 cP; visc_upper=16.0 cP; and visc_upper_limit=16.75 cP.

With respect to the four sets of conditions mentioned above, the first set of conditions is aimed at detecting or indicating a fuel leak or fuel contamination of the lubricant EL. This set of conditions is preferably given as follows: if each of the m n-hour slopes is less than zero, and the current hourly viscosity data value is less than visc_lower1, then a fuel leak is deemed to exist and the time to condemning limit is given by: time_to_cond_limit=(visc_lower_limit-the current hourly viscosity median)/the minimum of the m n-hour slopes.

The second set is aimed at detecting or indicating a slow fuel leak or minor fuel contamination of the engine lubricant EL. The second set preferably includes a single condition, given as follows: if each of the most recent N hourly viscosity medians is less than visc_lower2, then a slow fuel leak is deemed to exist and the time to condemning limit is given by: time_to_cond_limit=(visc_lower_limit-the maximum viscosity data value for the current hour)/an N-hour slope. The configurable parameter N is an integer number greater than n. Preferably, N=2n, or 24. Similarly, the N-hour slope is the slope calculated via equation (8) using the N most recently generated hourly viscosity data values.

The third set of conditions is aimed at detecting when or indicating that there is no fuel leak or fuel contamination of the engine lubricant EL. This set of conditions is preferably given as follows: if the current hourly viscosity data value is greater than visc_lower1 and less than visc_upper then a fuel leak is deemed not to exist. In this case, the time to condemning limit is determined based on an average of the m n-hour slopes. If the average is less than zero, then time_to_cond_limit=(visc_lower_limit-the maximum viscosity data value for the current hour)/the average, otherwise if the average is greater than zero, then time_to_cond_limit=(visc_upper_limit-the maximum viscosity data value for the current hour)/the average.

Finally, the fourth set of conditions is aimed at detecting when or indicating that soot and/or other byproduct build-up has significantly degraded the quality of the lubricant to a point where the upper viscosity condemning limit is being approached. This set of conditions is preferably given as follows: if each of the m n-hour slopes is greater than zero, and the current hourly viscosity data value is greater than visc_upper, then significant quality degradation is deemed to exist and the time to condemning limit is given by: time_to_cond_limit=(visc_upper_limit-the current hourly viscosity median)/the maximum of the m n-hour slopes.

In this manner then, the quality or amount of degradation of the engine lubricant EL is determined and/or diagnosed. The degree/level or existence of fuel contamination is also determined and/or diagnosed. Moreover, the diagnostic accuracy is improved insomuch as these goals are achieved via monitoring of the actual physical characteristic or properties of the engine lubricant itself. Additionally, the temperature dependant nature of the viscosity data or measurements is compensated for in the diagnosis.

Of course, various actions or combinations or actions may be taken at the take action step 312 depending upon the diagnosis. Preferably, the desired actions taken at step 312 include one or more of: notifying the engine's operator of a detected fuel leak or of the degree of a fuel leak or of the time until a condemning limit is reached, e.g., via the display 52 or other perceivable indicators; communicating the detected leak condition or time to condemning limit and associated data to the remote site, e.g., via the data link 56; where the detected leak is sufficiently serious or time to condemning limit sufficiently small, automatically shutting down the engine 2, either immediately or within a prescribed time period or within the time period before the condemning limit is reached; scheduling the engine 2 for service; exchanging old engine lubricant EL with fresh lubricant FL; etc.

Next, at decision step 316, it is decided whether or not the diagnostic process 300 should continue. If the process 300 should continue, it branches back to the acquisition step 304 by way of re-indexing step 318 for the next iteration of the process 300. Otherwise, the process 300 ends at step 320. Preferably, the process 300 continues automatically as long as the engine 2 is in operation. Optionally, the process 300 is engaged and/or disengaged as desired by the operator or otherwise, perhaps, via a query or command received from the remote site over the data link 56.

If the process 300 is continued, subsequent iterations are carried out with updated data. The data is preferably updated in the re-indexing step 314. With each update the oldest data values used in the immediately preceding iteration are disregarded, and the remaining other data values are shifted or re-indexed accordingly. Consequently, any newly acquired data values may be placed into the current iteration positions.

Please note that the foregoing discussion of the diagnostic process 300 preferably relates to railroad applications, i.e., engines such as those employed in railroad locomotives. Other applications are contemplated, such as mining machinery and other off-highway vehicles, that use like diagnostic processes which are tailored to the particular application. Of course, in other applications, the diagnostic process is optionally tailored differently for optimum performance therein. In any event, the processes similarly compensate for the temperature dependant nature of the viscosity characteristic or measurement. Optionally, a variable diagnostic process is employed which is tunable or tailored to the particular application in which it operates, or alternately, a fixed diagnostic process is employed in which the process branches to different sub-processes or algorithms based on the application.

In a preferred embodiment, the time to condemning limit determination process 200, the water/coolant leak detection process 100 and the viscosity based diagnosis 300 are carried out or run simultaneously with each other and/or other optional diagnostic processes which monitor lubricant quality, level, etc. In which case, the data and/or measurements collected from the sensors 28 which are common to multiple processes may be shared. Likewise, the start and end steps may be coincident, and, in fact, there may be a single start and a single end process which act as the start and end steps for multiple processes. Alternately, one or more of the processes are completely independent.

In short, the invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of monitoring a lubricant, said method comprising the steps of:
   (a) obtaining measurements of the lubricant's viscosity;
   (b) obtaining measurements of the lubricant's temperature;
   (c) normalizing the viscosity measurements based on the temperature measurements such that the normalized viscosity measurements all relate to a common reference temperature; and,
   (d) diagnosing a condition of fuel contamination of the lubricant based on the normalized viscosity measurements; and
   (e) distinguishing between different degrees of fuel contamination based on the normalized viscosity measurements.

2. The method according to claim 1 said method further comprising:
   (f) determining, based on the normalized viscosity measurements, a time to condemning limit for the lubricant due to fuel contamination.

3. The method according to claim 2 said method further comprising:
   (g) determining, based on the normalized viscosity measurements, a time to condemning limit for the lubricant due to quality degradation.

4. The method according to claim 1, said method further comprising:
   (e) determining, based on the normalized viscosity measurements, a time to condemning limit for the lubricant.

5. The method according to claim 4, wherein the time to condemning limit is selected from the group consisting of: an upper viscosity limit under which it is desired that the lubricant's viscosity remain, and a lower viscosity limit over which it is desired that the lubricant's viscosity remain.

6. The lubrication system for an engine said lubrication system comprising:
   a lubricant;
   a diagnostic cell which samples the lubricant for diagnostic testing thereof, said cell including;
   a viscosity sensor which monitors the lubricant's viscosity;
   a temperature sensor which monitors the lubricants temperature; and,
   a controller which interfaces with the diagnostic cell to carry out the diagnostic testing, said controller receiving viscosity data from the viscosity sensor and temperature data from the temperature sensor, wherein the viscosity and temperature data is processed to diagnose a condition of the lubricant, and wherein the viscosity data and the temperature data are processed to determine a time to condemning limit for the lubricant.

* * * * *